(12) United States Patent
Roper et al.

(10) Patent No.: US 9,450,684 B2
(45) Date of Patent: Sep. 20, 2016

(54) SYSTEM, METHOD AND APPARATUS FOR CONTROLLING BURIED DEVICES

(71) Applicant: VITAL ALERT COMMUNICATION INC., Thornhill (CA)

(72) Inventors: Michael James Roper, Ottawa (CA); Peter Kwasniok, Dunrobin (CA); Vladimir Puzakov, Kanata (CA)

(73) Assignee: VITAL ALERT COMMUNICATION INC., Thornhill, Ontario (CA)

( * ) Notice: Subject to any disclaimer, the term of this patent is extended or adjusted under 35 U.S.C. 154(b) by 0 days.

(21) Appl. No.: 14/377,705

(22) PCT Filed: Feb. 8, 2013

(86) PCT No.: PCT/CA2013/000118
§ 371 (c)(1),
(2) Date: Aug. 8, 2014

(87) PCT Pub. No.: WO2013/116938
PCT Pub. Date: Aug. 15, 2013

(65) Prior Publication Data
US 2015/0333843 A1    Nov. 19, 2015

Related U.S. Application Data

(60) Provisional application No. 61/596,497, filed on Feb. 8, 2012.

(51) Int. Cl.
*H04B 13/02* (2006.01)
*H04Q 9/00* (2006.01)

(52) U.S. Cl.
CPC ............ *H04B 13/02* (2013.01); *H04Q 9/00* (2013.01); *H04Q 2209/40* (2013.01); *H04Q 2209/883* (2013.01)

(58) Field of Classification Search
CPC .... H04B 13/02; H04Q 9/00; H04Q 2209/40; H04Q 2209/883
USPC ...................................... 455/40, 41.1, 575.5
See application file for complete search history.

(56) References Cited

U.S. PATENT DOCUMENTS

| | | | |
|---|---|---|---|
| 6,253,679 B1 * | 7/2001 | Woodall | F42C 13/047 102/206 |
| 6,370,396 B1 * | 4/2002 | Meiksin | H04B 1/38 455/557 |
| 7,043,204 B2 * | 5/2006 | Reagor | H04B 13/02 340/854.6 |

(Continued)

FOREIGN PATENT DOCUMENTS

| | | |
|---|---|---|
| WO | 2008141465 A1 | 11/2008 |
| WO | 2010141782 A1 | 12/2010 |
| WO | 2012006711 A1 | 1/2012 |

OTHER PUBLICATIONS

Patent Cooperation Treaty, Written Opinion and International Search Report dated Jun. 6, 2013, issued on PCT Application No. PCT/CA2013/000118.

*Primary Examiner* — Marceau Milord
(74) *Attorney, Agent, or Firm* — Norton Rose Fulbright Canada LLP; Maya Medeiros

(57) ABSTRACT

A system, method and apparatus for controlling buried devices by means of a very low frequency (VLF) modulated magnetic field capable of providing through-the-earth (TTE) communications. The system comprises a plurality of VLF transmission loop antennas positioned to cover a desired coverage area and configured to transmit a magneto-inductive signal to a desired operating depth. One or more VLF receivers are configured to receive one or more magneto-inductive signals from the one or more VLF transmission antennas. The VLF receivers are operatively connected to the buried devices, and configured to output a control signal thereto in response to the magneto-inductive signals. The plurality of VLF transmission loop antennas may be square or rectangular antennas positioned in an array to cover the desired coverage area, the VLF transmission loop antennas sized and sufficiently powered to transmit the magneto-inductive signal to the desired operating depth.

22 Claims, 16 Drawing Sheets

(56) References Cited

U.S. PATENT DOCUMENTS

| | | | | |
|---|---|---|---|---|
| 7,796,943 B2* | 9/2010 | Levan | H04B 13/02 324/344 |
| 8,131,213 B2* | 3/2012 | Porter | H04B 13/02 340/572.1 |
| 8,305,227 B2* | 11/2012 | Jaffrey | H04B 13/02 340/850 |
| 8,310,238 B2* | 11/2012 | Baiden | G01S 5/14 324/334 |
| 8,542,114 B2* | 9/2013 | Stolarczyk | H04M 1/026 340/539.13 |
| 8,566,043 B2* | 10/2013 | Royle | G01V 3/081 324/326 |
| 2009/0140852 A1* | 6/2009 | Stolarczyk | H01Q 1/04 340/539.13 |
| 2009/0179818 A1 | 7/2009 | Rhodes et al. | |
| 2010/0311325 A1* | 12/2010 | Marshall | H04B 13/02 455/40 |
| 2012/0242135 A1 | 9/2012 | Thomson et al. | |
| 2013/0157713 A1* | 6/2013 | Stolarczyk | H04M 1/026 455/550.1 |
| 2013/0196593 A1* | 8/2013 | Roper | H04B 13/02 455/40 |

\* cited by examiner

SYSTEM, METHOD AND APPARATUS FOR CONTROLLING BURIED DEVICES

CROSS-REFERENCE TO RELATED APPLICATIONS

This application claims priority under 35 USC §119(e) of U.S. Provisional Patent Application No. 61/596,497 filed on Feb. 8, 2012, the contents of which are hereby incorporated by reference.

FIELD OF THE INVENTION

The present invention relates generally to a system, method and apparatus for controlling buried devices or sensors by means of a very low frequency (VLF) modulated magnetic field capable of providing through-the-earth (TTE) communications. More specifically, the present invention relates to a system, method and apparatus which can be used to control an array of buried devices that are spread over a large area.

BACKGROUND OF THE INVENTION

It is known that most current wireless communication technologies are unable to traverse a thick solid barrier made from materials such as rock, concrete or soil. At frequencies greater than a few kHz, these barriers attenuate electromagnetic waves to the point where communication is not possible over even very short distances (e.g. less than 0.1 m). In applications where it is desirable to communicate with a device that is buried in the ground, it is therefore common practice to connect wires to the device which are extended to the surface, where they may be connected to a communications network or device. Examples of such arrays of buried devices include seismic monitors, and electronic detonators. These are typically deployed in boreholes drilled into the rock mass from the earth's surface or within a mine tunnel. Typically, these boreholes may be 6 to 20 cm in diameter, and the buried devices may be placed at borehole depths varying from 1 m to over 100 m. In some applications, for example open pit mining, an array of buried detonators is deployed over a large physical area, extending perhaps over many hundreds of square meters. In below ground mining, new methods such as described in US Patent Application 20120242135 may also require detonators to be deployed over a large area and detonated at different times.

FIG. 1 illustrates the current practice for controlling such an array of buried sensors or other devices. The buried devices 1 located in one or more boreholes 2 or buried by other means are connected to a common controller 3 using separate insulated conductors 4, commonly in the form of a twisted pair of wires. These wires can be used to send data and power to the buried devices. Wiring up a large array of devices can therefore require a significant amount of labor to connect each device via wires running from the borehole to the Controller. For cost reasons the wiring is generally left exposed on the surface and is therefore vulnerable to damage either from weather, wildlife or human activity. Also, when the wiring is run down the borehole, the wiring and the buried device may also be exposed to mechanical and electrical damage from water seeping down the borehole. These factors may reduce the reliability of the wired communications links. Thus, it is clear that there is a need for an improved means of communicating with the buried devices without the cost and reliability issues associated with the use of wired communication links.

SUMMARY OF THE INVENTION

The present invention provides a system, method and apparatus for controlling buried devices or sensors by means of a very low frequency (VLF) modulated magnetic field capable of providing through-the-earth (TTE) communications.

In an aspect, there is provided a through-the-earth (TTE) communication system for wirelessly controlling one or more buried devices in a desired coverage area, comprising one or more very low frequency (VLF) transmission loop antennas positioned to cover the desired coverage area, the one or more transmission loop antennas each configured to transmit a magneto-inductive signal to a desired operating depth; and one or more VLF receivers configured to receive one or more magneto-inductive signals from the one or more VLF transmission antennas, the one or more VLF receivers operatively connected to the one or more buried devices and configured to each output a control signal to a corresponding one of the one or more buried devices in response to the one or more magneto-inductive signals.

In an embodiment, the one or more VLF transmission loop antennas are configured to provide a maximum flux density at a desired control depth.

In another embodiment, the system further comprises one or more transmitters operatively connected to the one or more VLF transmission loop antennas, each transmitter configured to control a time at which a corresponding one of the one or more VLF transmission loop antennas transmits the magneto-inductive signal.

In another embodiment, the system further comprises a transmission controller operatively connected to the one or more transmitters and configured to assign each transmitter to a selected one of a number of different timeslots contained in a master timing frame, whereby only one of any adjacent VLF transmission loop antennas is allowed to transmit the magneto-inductive signal in a given one of the timeslots.

In another embodiment, the transmission controller is time multiplexed and configured to assign more than one transmitter to a selected one of the timeslots for transmission of the magneto-inductive signal in the selected timeslot, provided that the VLF transmission loop antennas connected to the more than one transmitter are not adjacent and each transmits the magneto-inductive signal so as not to interfere with one another.

In another embodiment, the one or more VLF transmission loop antennas comprise a plurality of square or rectangular antennas positioned in an array to cover the desired coverage area, each of the plurality of VLF transmission loop antennas sized and powered to transmit the magneto-inductive signal to the desired operating depth.

In another embodiment, the one or more VLF receivers are configured to operate in a sleep mode, and responsive to a wake signal to prepare to receive the one or more magneto-inductive signals from the one or more VLF transmission antennas.

In another embodiment, the one or more VLF receivers are configured to temporarily buffer the one or more received magneto-inductive signals within one or more defined timeslots in a master frame, whereby the one or more VLF receivers can each output the control signal to the corresponding one of the one or more buried devices at a time derived from the master frame.

In another embodiment, the one or more VLF receivers are each configured to receive from the one or more VLF transmission antennas a meta-command, the meta-command occupying a single timeslot in a master frame and instructing the one or more VLF receiver to each download pre-programmed data or commands to the corresponding one of the one or more buried devices.

In another aspect, there is provided a method of through-the-earth (TTE) communication for wirelessly controlling one or more buried devices in a desired coverage area, comprising receiving one or more magneto-inductive signals from one or more VLF transmission loop antennas, the one or more VLF transmission loop antennas positioned to cover the desired coverage area and each configured to transmit a selected one of the one or more magneto-inductive signals to a desired operating depth; and outputting a control signal to the one or more buried devices in response to the one or more magneto-inductive signals.

In an embodiment, the method further comprises configuring the one or more VLF transmission loop antennas to provide a maximum flux density at a desired control depth.

In another embodiment, the method further comprises controlling, using one or more transmitters operatively connected to the one or more VLF transmission loop antennas, a time at which each of the one or more VLF transmission loop antennas transmits a given one of the one or more magneto-inductive signals.

In another embodiment, the method further comprises providing a master timing frame containing a number of different timeslots; and assigning each transmitter to a given one of the timeslots for transmission of the one or more magneto-inductive signals; whereby only one of any adjacent VLF transmission loop antennas is allowed to transmit the given magneto-inductive signal in the given timeslot.

In another embodiment, the method further comprises assigning more than one transmitter to a selected one of the timeslots for transmission of more than one magneto-inductive signals in the selected timeslot, provided that the VLF transmission loop antennas connected to the more than one transmitter are not adjacent and each transmit the given magneto-inductive signal so as not to interfere with one another.

In another embodiment, the method further comprises receiving meta-commands that occupy a single one of the timeslots, decoding the meta-commands, and downloading a set of pre-programmed data or commands to the buried devices at a time derived from the master timing frame.

In another embodiment, receiving the one or more magneto-inductive signals comprises receiving the one or more magneto-inductive signals from a plurality of square or rectangular VLF transmission loop antennas positioned in an array to cover the desired coverage area, the plurality of VLF transmission loop antennas each sized and powered to transmit the magneto-inductive signal to the desired operating depth.

In another embodiment, the method further comprises receiving a wake signal when in a sleep mode; and in response to the received wake signal, preparing to receive the one or more magneto-inductive signals from the one or more VLF transmission antennas.

In another embodiment, the method further comprises temporarily buffering the one or more magneto-inductive signals within one or more defined timeslots; and simultaneously outputting the control signal to a plurality of the one or more buried devices.

In another aspect, there is provided a through-the-earth (TTE) communication apparatus for wirelessly controlling one or more buried devices in a desired coverage area, comprising a VLF receiver operatively connected to the one or more buried devices and configured to receive one or more magneto-inductive signals from one or more VLF transmission antennas; and a remote control unit operatively connected to the VLF receiver and the one or more buried devices, the VLF receiver configured to output a control signal to the one or more buried devices in response to the one or more magneto-inductive signals received from one or more VLF transmission loop antennas positioned in an array to cover the desired coverage area.

In an embodiment, the VLF receiver is configured to operate in a sleep mode, and, responsive to receiving a wake signal, to prepare to receive the one or more magneto-inductive signals from the one or more VLF transmission antennas.

In an embodiment, the VLF receiver is configured to temporarily buffer a received one of the one or more magneto-inductive signals, and to output the control signal to a plurality of the one or more buried devices simultaneously.

In still another aspect, there is provided a through-the-earth (TTE) communication apparatus for wirelessly controlling one or more buried devices in a desired coverage area, comprising a transmitter; one or more VLF transmission loop antennas operatively connected to the transmitter and positioned in an array to cover the desired coverage area, the one or more VLF transmission loop antennas each configured to transmit a data signal from the transmitter as a magneto-inductive signal to a desired operating depth; and one or more VLF receivers configured to receive one or more magneto-inductive signals from the one or more VLF transmission antennas, the one or more VLF receivers operatively connected to the one or more buried devices and each configured to output a control signal to a corresponding one of the one or more buried devices in response to the data signal from the transmitter.

In an embodiment, the data signal from the transmitter is in the form of a meta-command which is decoded by each one of the one or more VLF receivers to output a set of data or commands previously stored in the VLF receiver to the corresponding buried device.

In an embodiment, the transmission antennas are of a square loop design, and are sized to provide a desired operational depth while operating at safe voltage levels.

In an embodiment, the transmit signals are time multiplexed onto a frame containing different time-slots to so that adjacent transmission antennas do not transmit at the same time. This time multiplexed arrangement prevents interference between the plurality of transmission antennas and ensures that the magnetic field under each transmission antenna has the same characteristics. By this means, all of the VLF receivers buried in the coverage area are able to receive the transmitted signal with a very high degree of reliability.

In another embodiment, the transmission antenna array can be configured to cover an area of an arbitrary size by means of a timeslot re-use scheme, wherein each timeslot includes a synchronization word which allows the VLF receivers to utilize an efficient sleep mode, and so conserve battery power.

DESCRIPTION OF THE DRAWINGS

FIGS. 13a, 13b and 13c illustrate different timeslot re-use patterns for the transmitter in accordance with an embodiment.

DETAILED DESCRIPTION

As noted above, the present invention relates generally to a system, method and apparatus for controlling an array of buried devices, such as sensors or detonators, by means of a VLF modulated magnetic field capable of providing TTE communications through the earth or other similar thick, solid barriers.

In order to explain the benefits and improved performance of the present system, method and apparatus, the performance limitations of a single loop antenna are first described. The ability of VLF signals to penetrate solid materials is well known, and several prior art systems have been designed to provide through-the-earth or TTE communications at a frequency typically below 10 kHz using magnetic induction. At very low frequencies, the wavelength of an electromagnetic wave is greater than 1000 km, which is typically much greater than the space available, even in a large coverage area. Conventional transmission antennas at VLF frequencies tend to be inefficient and low powered. However, an alternating VLF magnetic field can be created and detected using antennas of a suitable size.

In the absence of an electric field, the magnetic field created by a current I flowing through a length of wire is given by the Biot-Savert Law:

$$B = \int \frac{\mu_0}{4\pi} \frac{Id\mathbf{l} \times \mathbf{r}}{|r|^3}, \quad [1]$$

where B is the magnetic field strength (Tesla), the vector dl is the direction of the current, $\mu_0$ is the magnetic constant, r is the distance between the location of dl and the point at which the magnetic field is being calculated, and r is the displacement vector from the current element to the point at which the field is being calculated. A wire loop laid on the surface and driven by a low frequency alternating current provides a convenient means of generating a VLF magnetic field that can be detected by an antenna and receiver below the surface. In this case the constant current I is replaced by the time varying current I·cos (2πwt).

If the magnetic field is modulated, it can be used to convey data to the buried devices, for example to instruct them to start logging data or to initiate a detonation.

Figure 1:
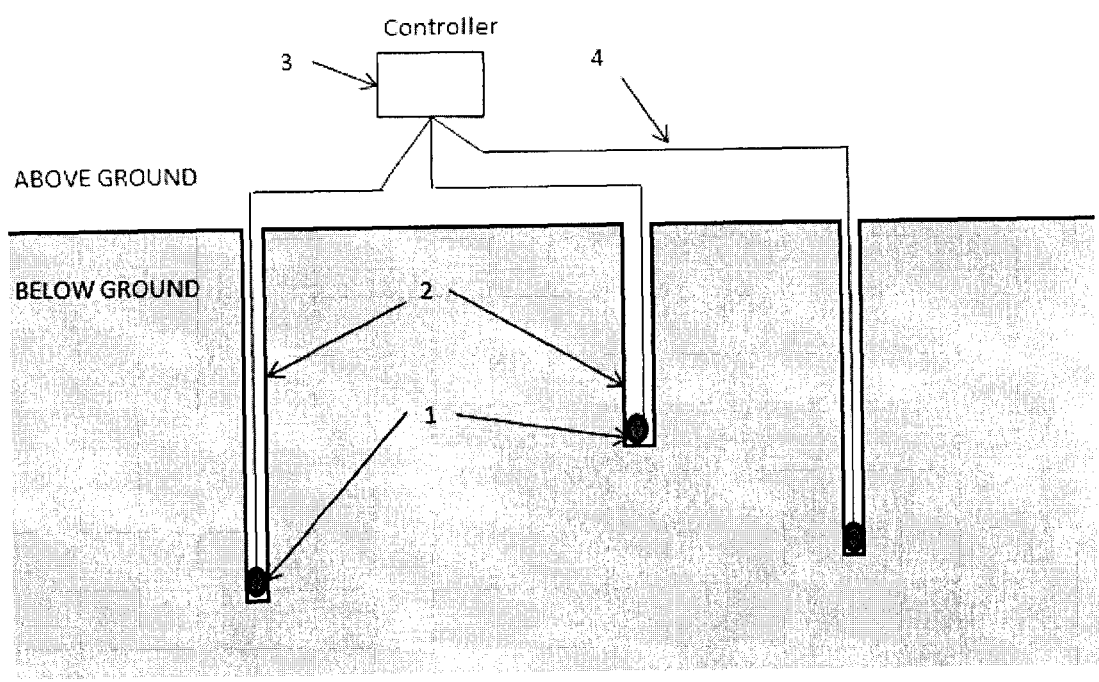
FIG. 1 illustrates a prior art wired control system.
Figure 2:
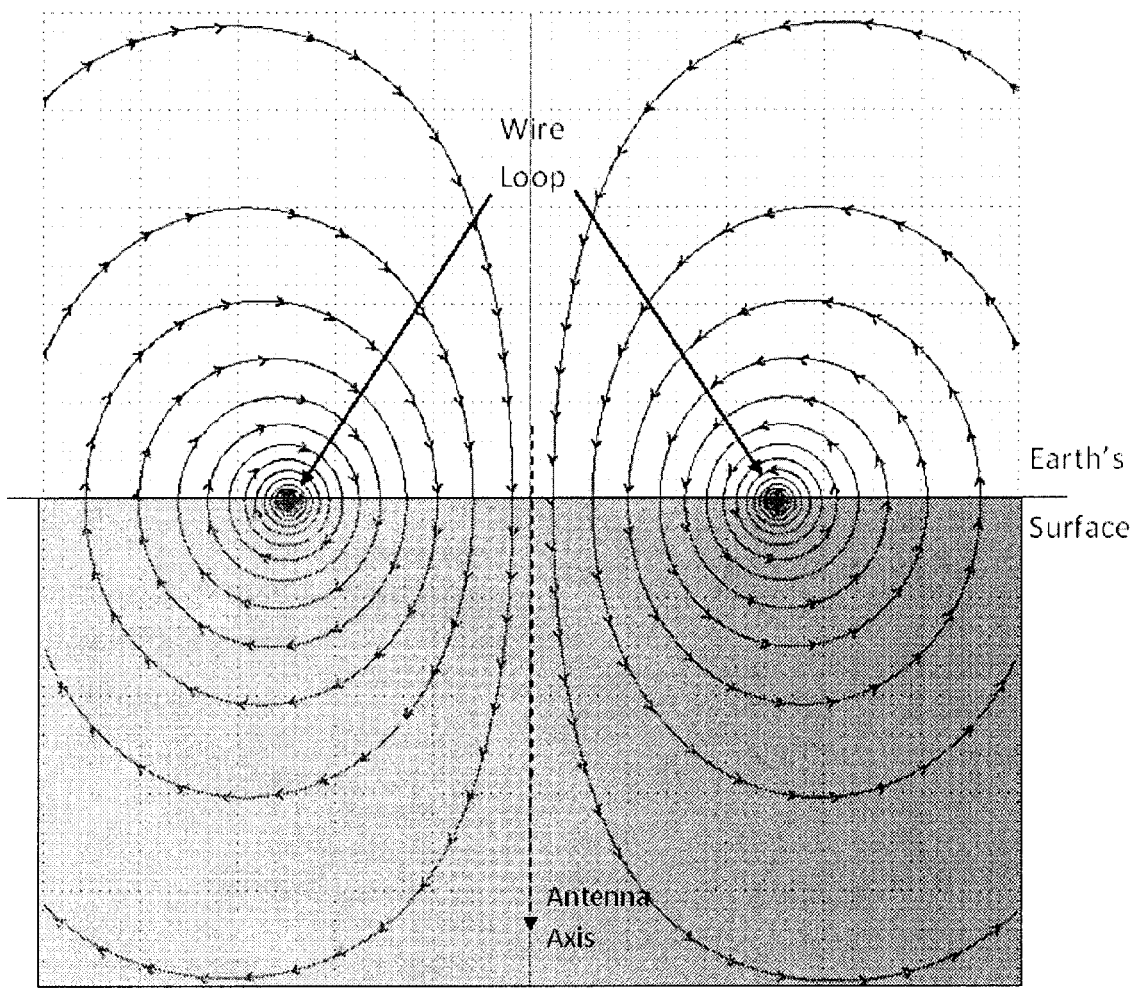
FIG. 2 illustrates the magnetic field produced by a circular loop antenna.

For a circular wire loop, the following closed form expression is widely used in the prior art to calculate the magnetic flux density at a point along the axis of a loop antenna;

$$Br = \frac{\mu_0 A.N.I}{2\pi r^3} \cos(2\pi wt) \quad [2]$$

where Br is in Tesla (W/m$^2$)
A=loop area=π·(d/2)$^2$
N=number of loops (turns)
I=current, with angular frequency w=k√(με)
r=distance from the coil center Equation [2] indicates that the field strength at a distance r will increase in proportion to the area A of the antenna. However this is only valid for cases where r is greater than the dimensions of the loop. For a typical large array of devices, buried at depths of 5 to 100 m over an area of 10,000 sq m, this is not the case. For this configuration the field must be calculated from equation [1] by integrating the sum of the current elements dl around the perimeter of the antenna. The resulting pattern of the magnetic field produced by a circular loop antenna is shown in FIG. 2. The field is symmetrical and so is plotted in two dimensions. The magnetic field is strongest close to each wire where it is circular. In the region between the wires, the fields from each wire reinforce one another. The flux density is smallest at the midpoint between the two wires and decreases along the axis of the loop. The flux density is also lower outside the loop where the fields from each wire have opposing polarities.

The alternating field produced by a conventional circular loop antenna may be detected in the ground below the antenna using a second loop antenna, which converts the alternating magnetic field to an emf in accordance with Faraday's Law, where output emf E from a loop antenna is given by:

$$E = \mu * A * N * -\frac{dB}{dt} \quad [3]$$

where,
$\mu = \mu_o * \mu_r$, the effective permeability of the material inside the loop
A=the area of the loop
N=the number of turns in the loop
B=the magnetic flux density Because the direction of the field in relation to the receiver orientation is generally unknown, in order to ensure reception of the magnetic field, three antennas must be used, aligned on three orthogonal axes within the diameter of the borehole. The antennas must be similar, and the antenna length or diameter (and hence area, A) cannot exceed the borehole diameter, limiting the antenna sensitivity. The antenna sensitivity may be improved by using a loop with a large number of turns and a ferrite core. However the effective value of the permeability of the core is also constrained by the restriction on its dimensions to a value much lower than $\mu_r$. As a result, for 1 kbpsec throughput and BER less than 1E-6, the practical minimum usable signal level in this application is of the order of 0.2 nT.

In U.S. Pat. No. 7,149,472, Reagor teaches the use of a superconducting quantum interference device (SQUID) to detect very weak alternating magnetic fields, based on the use of high temperature superconductors. These devices are small enough to be packaged for insertion into a borehole, but only function at low temperatures where superconductivity is obtained. This requires them to be cooled by liquid helium or in the case of "high temperature" superconductors by liquid nitrogen, i.e. to a temperature of 77 K. This is not practical when the receiver is buried in a borehole due to the difficulty of maintaining such a low temperature over a long period of time and with the power supply for cooling limited by battery size.

Figure 3A:
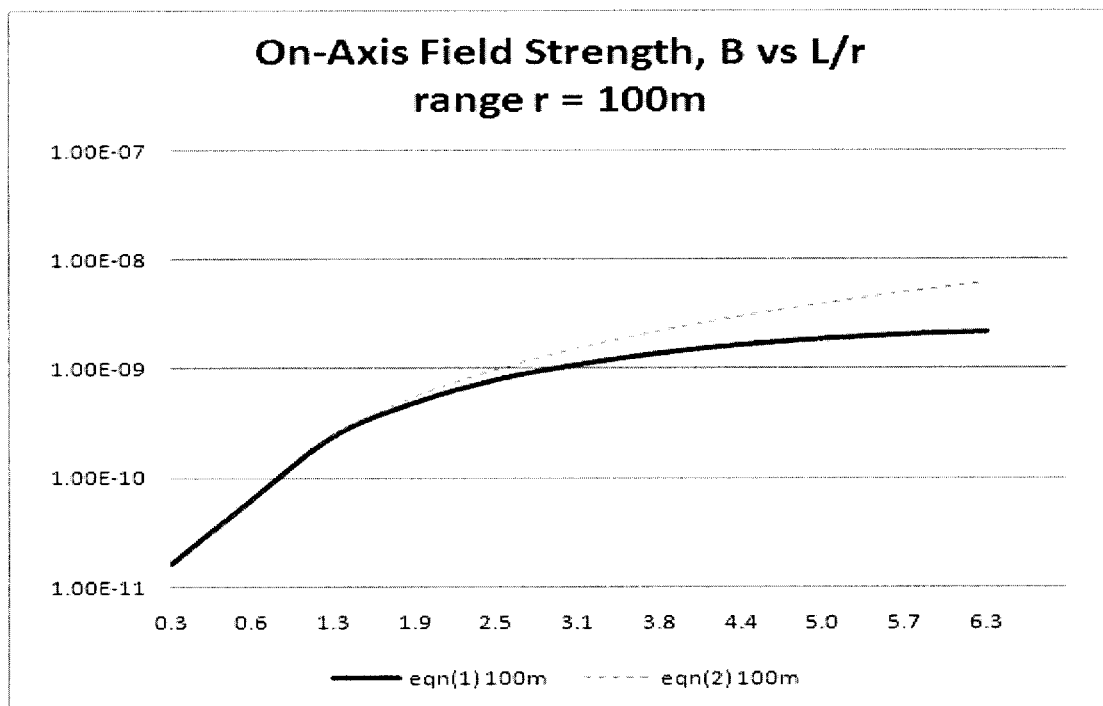
FIG. 3 illustrates the variation in flux density below a circular loop antenna at depths of 100 m and 10 m.
Figure 3B:
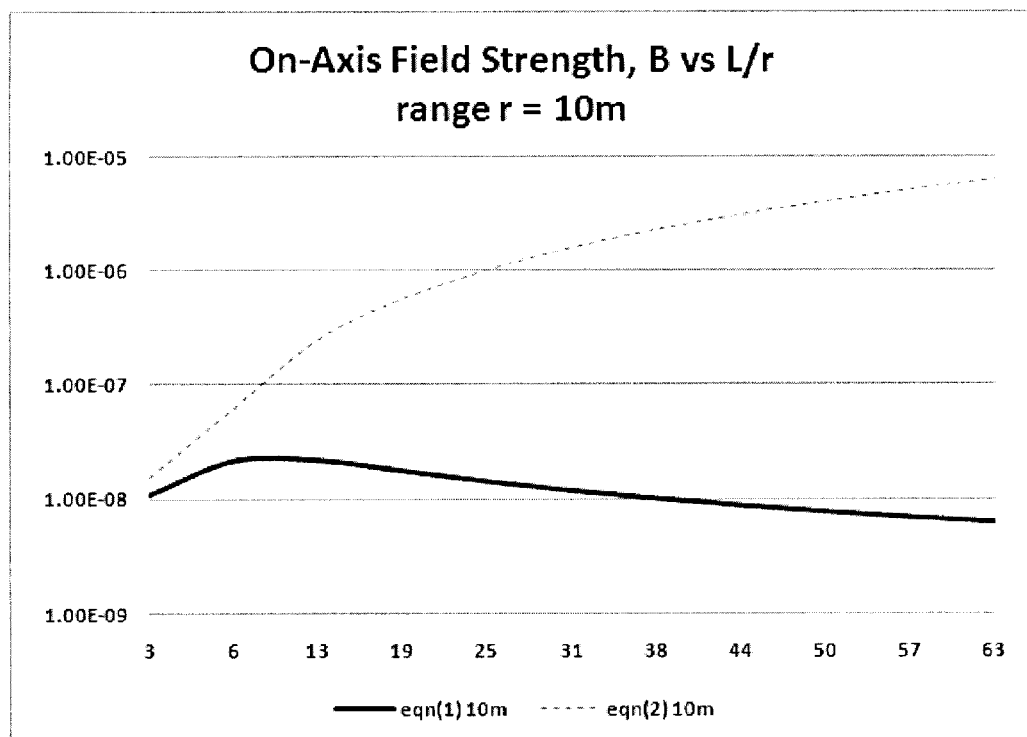

FIGS. 3a and 3b show the magnetic flux density at a range (depth) of 100 m and 10 m respectively on the axis of a single turn circular wire loop as a function of antenna wire length, using the direct integration method of Equation [1]. The antenna current is normalized to 1 A and field strength is plotted as function of the ratio L/r where L is the antenna wire length. With a constant current, the flux density increases slowly with antenna size to a maxima where L/r=10. The flux density predicted by the conventional closed form expression is included for reference, showing that equation [2] becomes inaccurate when L/r>2. In practice, for a given transmitter voltage, the antenna current is not constant as it depends on the inductance of the loop, which also depends on the dimensions of the antenna. The inductance of a rectangular or square loop is given by the following equation;

$$L_{rect} = N^2 \frac{\mu_0 \mu_r}{\pi} \left[ -2(w+h) + 2\sqrt{h^2+w^2} - h\ln\left(\frac{h+\sqrt{h^2+w^2}}{w}\right) - w\ln\left(\frac{w+\sqrt{h^2+w^2}}{h}\right) + h\ln\left(\frac{2h}{a}\right) + w\ln\left(\frac{2w}{a}\right) \right] \quad [4]$$

where,
N=number of turns in the loop
a=diameter of the wire
w=the width of the rectangle
h=the length of the rectangle (for a square loop h=w)
$\mu=\mu_o\mu_r$, the effective permeability of the material inside the loop The inductance of a rectangular or square loop is proportional to $N^2$. Therefore it is preferable to use a single turn loop (N=1) to minimize the antenna inductance and avoid the need for a high voltage at the transmitter output. Voltages of up to 40V peak may be used without creating a potential safety hazard, allowing the antenna to be placed directly on the ground.

Figure 4:
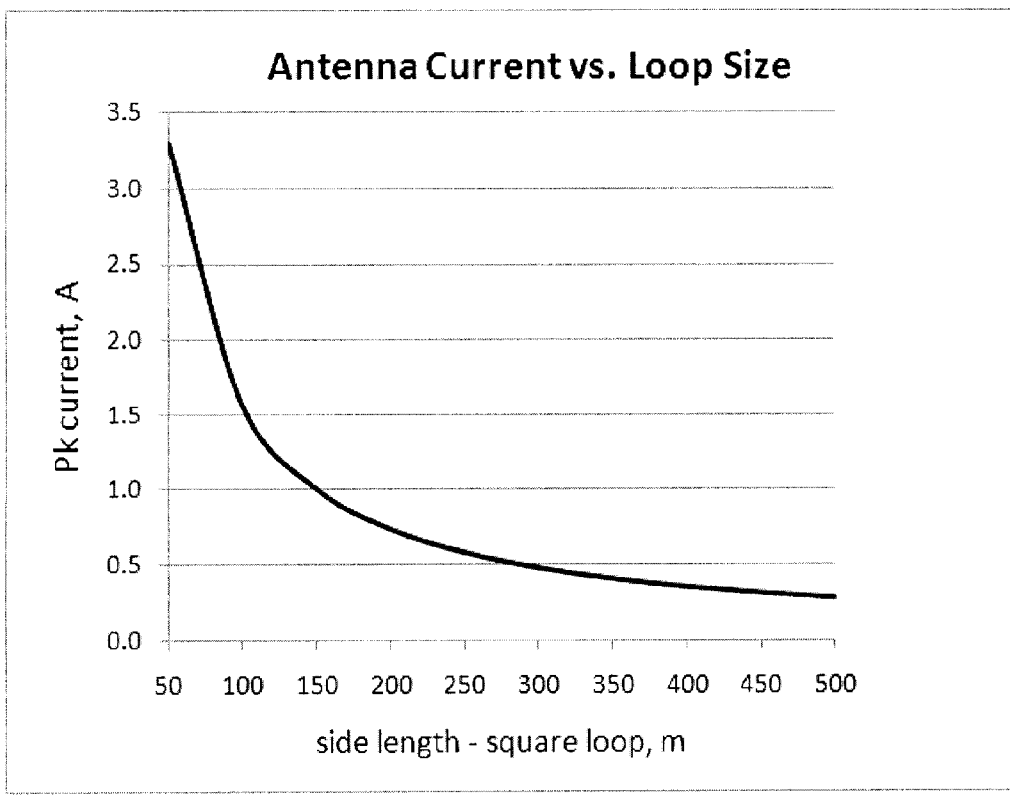
FIG. 4 illustrates the current in a single loop square antenna as a function of the length of the antenna wire in accordance with an embodiment.

FIG. 4 illustrates the variation of peak antenna current as a function of the side length of a square antenna. The frequency is 4 kHz and in this example the loop is assumed to be formed using #18 gauge wire which has a resistance of 0.022 ohms per m. The current is substantially limited by the inductance of the antenna, and is approximately inversely proportional to the side length over the range 50 m to 500 m.

While it is possible to reduce the impedance of the loop, and thus increase the antenna current, by connecting a capacitor in series with the antenna to create a resonant circuit, there are a number of reasons why this is not desirable. When tuned, the voltage across the antenna loop is equal to the transmitter output voltage multiplied by the quality factor (Q) of the tuned circuit. As noted above, it is desirable to keep this voltage at a level that does not present a hazard to personnel. Secondly, the Q of the tuned antenna, which is mainly determined by the antenna inductance and resistance, also limits the bandwidth available for data transmission. Thirdly, the power absorbed by the antenna is proportional to the square of the antenna current, so operating at a higher current can have a major impact on the endurance of a battery powered transmitter.

Figure 5:
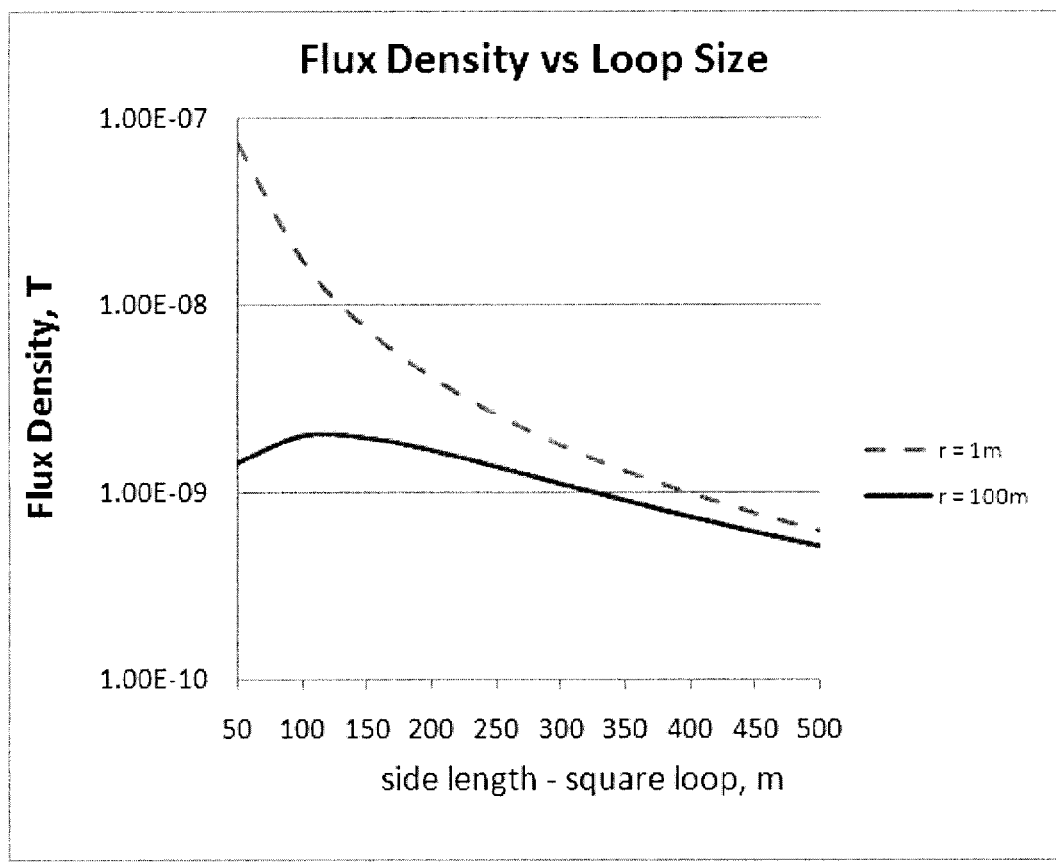
FIG. 5 illustrates the variation in flux density below a square loop antenna as a function of the length of the antenna wire in accordance with an embodiment.

FIG. 5 plots the magnetic field calculated by the line integral method for a square loop at depths of 1 m and 100 m using the maximum current available from a 36V source and without a series tuning capacitor. The magnetic flux density at 100 m depth reaches a maximum with an antenna 100 m×100 m (L/r=4), and decreases slowly as the antenna is made larger and the increasing inductance further reduces the current. FIG. 5 also illustrates that the flux density at a depth of 1 m, near the surface, decreases more rapidly as the antenna size increases from 50 m×50 m, approaching the value at 100 m depth for antennas greater than 500×500 m. However it is generally desirable to have a stronger signal at the surface, where the level of electrical noise originating from the atmosphere or man-made sources is greatest. It is therefore clear that the transmit antenna loop cannot be made arbitrarily large without reducing the signal level at the maximum operating depth, or creating a weak signal close to the surface.

While several communications systems are proposed in the prior art for TTE communications, the problem of providing coverage over an arbitrarily large area required for buried sensors is not addressed. U.S. Pat. No. 5,093,929 to Larry G. Stolarczyk et al. teaches a method for using an underground mine communication system to effect mine-wide communication. The system achieves communications over a wide underground area using repeaters to extend the range of individual communications links, each repeater requiring a power source that is capable of supplying the transmitter, as well as a large transmit antenna. This system cannot therefore be adapted to control a large number of small, buried devices or sensors.

U.S. Pat. No. 7,043,204 to David Reagor et al. teaches a method and apparatus for effective through-the-earth communication involving a signal input device connected to a transmitter operating at a predetermined frequency sufficiently low to effectively penetrate useful distances through-the-earth. The system uses a single transmit loop antenna to provide point to point communications through the earth and does not provide a means of communicating with multiple receivers spread over a large area.

Great Britain Patent No. 2455909 to Mark Rhodes et al. teaches an antenna formed of multiple planar arrayed loops that is claimed to require a lower voltage power supply than an equivalent single loop on the basis that it has a lower inductance since currents in adjacent loops inside the antenna area cancel. However with this arrangement the magnetic field produced by such an antenna is the same as for an equivalent single loop with the same perimeter, yet the total power consumption of this arrangement is much higher than that of an equivalent single loop due to the power losses in all the interior wires. Means must also be provided for each transmitter to provide an identical output signal, with the same amplitude and phase. As with a single large loop, the flux density produced by this simple arrangement of loops will reduce as the array is made larger, so it cannot be scaled for use over an arbitrarily large area.

U.S. Pat. No. 7,929,270, to Dirk Hummel et al. describes a system in which multiple detonators communicate wirelessly, with the detonators able to relay data and control messages through the network. This system architecture allows the array of detonators to be larger than the transmission range of the wireless system, but at the expense of having each detonator equipped with a transmitter as well as a receiver. This greatly increases the cost of the detonator compared to a conventional wired device. In addition, boreholes are too small to accommodate a VLF transmit antenna capable of transmitting more than a few feet through solid material, so this architecture is effectively limited to applications where the antenna can protrude above the rock-mass.

As will now be explained in more detail, the present system, method and apparatus provides a means of overcoming a number of problems and limitations in prior art designs through the use of an array of transmitting antenna loops, each of an optimum size required to communicate to a given depth and driven by an array of time multiplexed transmitters so that no unwanted interaction occurs between the transmission antenna loops.

The present system, method and apparatus provides one way communication from the earth surface to a plurality of buried devices spread over an arbitrarily large area at varying depths. Because it is a one way communication link, the signal level at the receivers cannot be verified. Thus, in order to be able to ensure each receiver will receive an adequate signal, the present system, method and apparatus divides the desired coverage area into a number of identical volumes, each defined at the earth's surface by the boundary of a square transmitter antenna loop.

In accordance with a preferred embodiment, the entire coverage area may be covered by an array of adjacent transmission antennas, each of the optimum size for communications at a desired operational depth for a given application. For example, FIG. 5 illustrates that the optimal antenna size for a maximum operational depth of 100 m is around 100×100 m. With these dimensions, the flux density at 100 m depth is maximized and at 1 m depth is higher by 20 dB at the centre of the loop.

Figure 6:
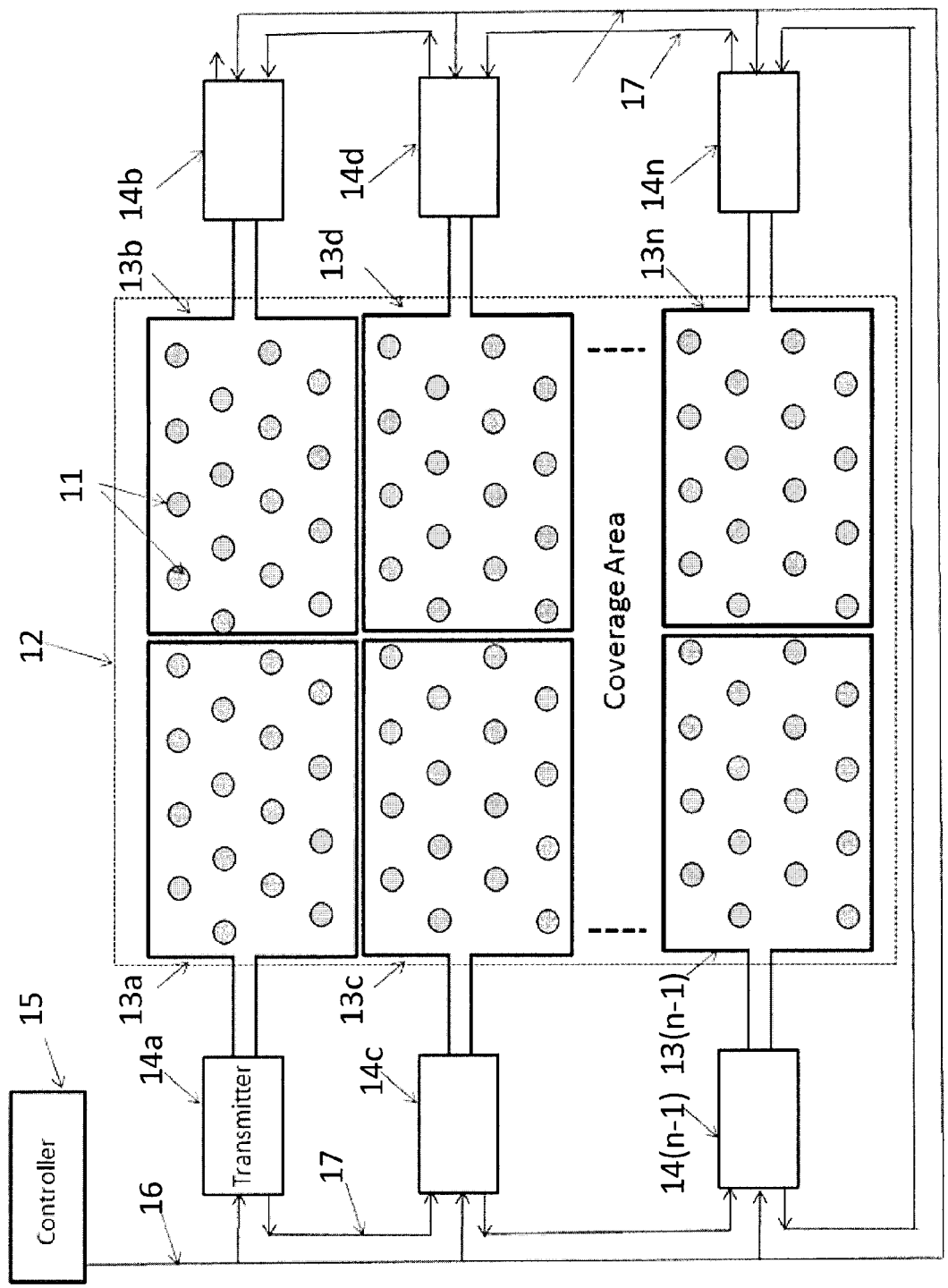
FIG. 6 illustrates a block diagram of a system and apparatus in accordance with an embodiment.

FIG. 6 illustrates a block diagram of a system and apparatus in accordance with an embodiment. As shown, a plurality of buried devices, such as sensors, 11 each connected to a TTE receiver (not shown) are buried over a large coverage area 12, at a variety of depths up to a maximum of 100 m, for example. The coverage area is overlaid with a number of adjacent square loop transmission antennas 13a, 13b, . . . 13n, providing continuous coverage but without the antennas overlapping. Each loop antenna 13a, 13b, . . . 13n may have a dimension of 100 m×100 m, suitable for a maximum operating depth of 100 m, and is driven by a separate TTE transmitter 14a, 14b . . . 14n with an alternating current at a frequency below 20 kHz.

In an embodiment, the transmitter current is modulated with synchronization words and data to create a modulated magnetic field that is detected by the TTE receivers buried in the coverage area 12. Each transmitter 14a, 14b . . . 14n is connected to a central controller 15 that is used to send data messages to the transmitters 14a, 14b . . . 14n via a common data cable 16. A primary transmitter 14a provides the timing reference signal used to synchronize each transmitter 14a, 14b . . . 14n to a common timing frame that is divided into timeslots. The timing reference is passed from one transmitter 14a, 14b . . . 14n to the next via a twisted pair wiring connection 17. For convenience, the controller data and timing signal may be enclosed in the same cable. Each transmitter 14a, 14b . . . 14n is assigned one timeslot in the frame. The number of timeslots used depends on the geometry of the coverage area 12 and is chosen such that adjacent ones of the antennas 13a, 13b, . . . 13n do not transmit at the same time and to prevent interference if timeslots are re-used. These aspects of the invention are described in more detail below with reference to FIGS. 9, 10, 12 and 13a, 13b and 13c.

Figure 7A:
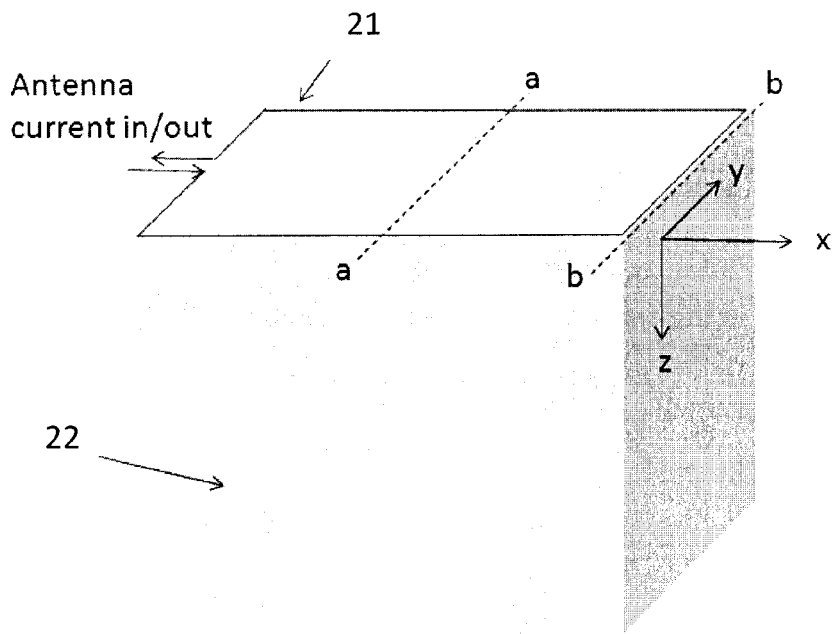
FIG. 7 illustrates the flux density at different sections of the volume below a square loop antenna in accordance with an embodiment.
Figure 7B:
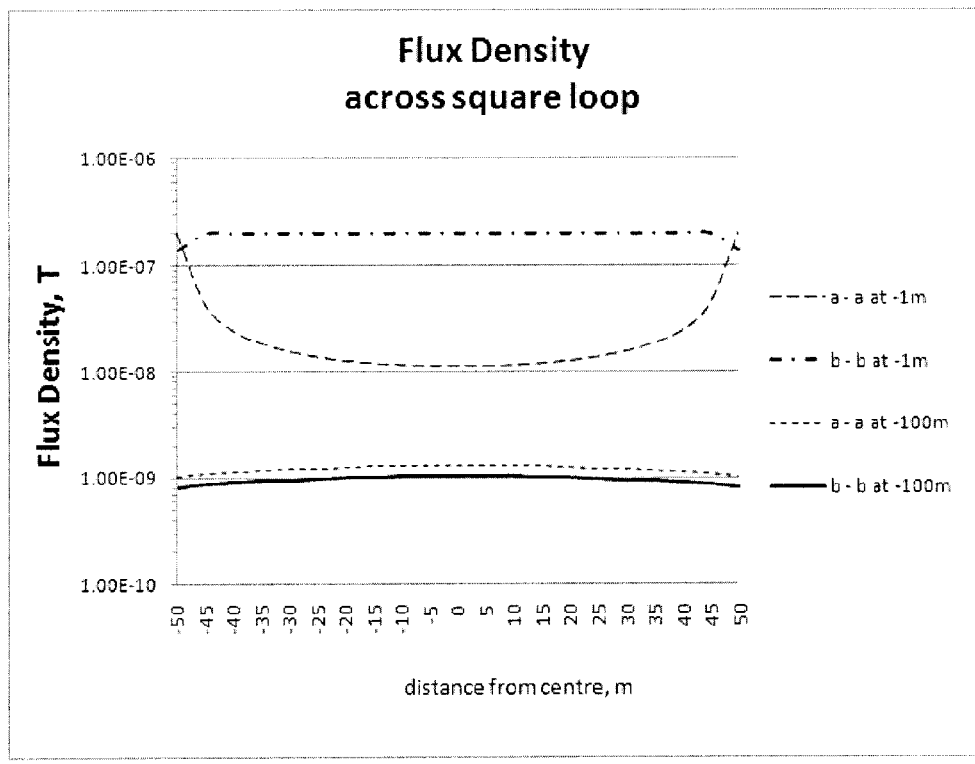

Now referring to FIG. 7a and FIG. 7b, in an embodiment, a square antenna shape 21 is used as it provides continuous coverage without overlap and is relatively easy to survey and set up compared to a more complex shape such as a hexagon. FIG. 7a illustrates in more detail the variation in flux density in the volume of the earth 22 below ground covered by a single square loop antenna 21. The antenna 21 lies on the earth surface on the x, y axes. The flux density is plotted along two sections across the volume of earth 22 at depths of 1 m and 100 m on the z axis, namely across the centre of the loop (section a-a) and under one of the antenna wires (section b-b). The magnitudes of the flux density at these cross sections of the earth 22 are illustrated in FIG. 7b. Within the volume immediately below the loop at a depth of 100 m, the flux density is quite uniform with a variation of less than 3 dB. At 1 m depth, the flux density is approximately 20 dB higher in the centre of the coverage volume, as illustrated in FIG. 7b, increasing immediately under the wires (section b-b and the extreme ends of section a-a). The flux density within the volume 22 bounded by the antenna 21 is thus well defined and provides a known minimum and maximum field strength to the receivers in the volume of earth 22 below the antenna 21. The magnetic field will be subject to an additional attenuation as depth increases beyond about 20% of the skin depth of the strata within which the devices are buried, where the skin depth is determined by the operating frequency and the bulk conductivity of the material. The maximum depth that can be used in a given coverage area field should therefore be determined based on the worst case bulk conductivity of the material in the coverage area.

In a preferred embodiment of the current invention, multiple square loop antennas as in 21 may be positioned in an array to provide coverage over a desired coverage area which ensures that a buried device located at any point in the coverage area, up to a maximum operation depth, will be able to receive a signal from the surface. To avoid any variation due to propagation or antenna characteristics, the same transmission frequency may be used in each loop. However, the fields created by the currents in the parallel wires from adjacent loops can cancel one another, thus altering the flux density in the earth below the antenna. To avoid interaction between the fields created in adjacent loops, the transmissions are time multiplexed, so that no currents flow in adjacent loops at the same time.

Figure 8:
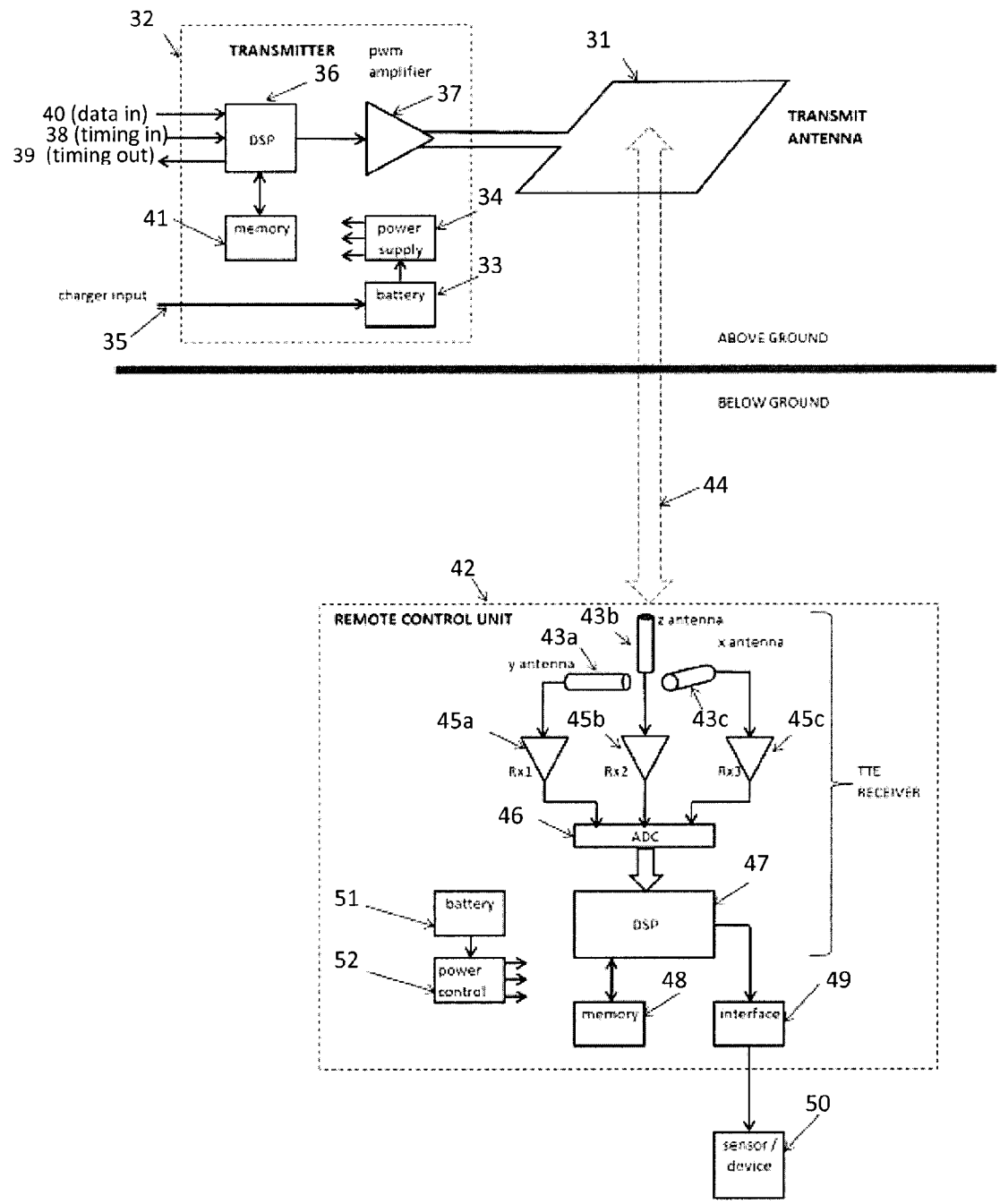
FIG. 8 illustrates a block diagram of a transmitter and receiver in accordance with an embodiment.

FIG. 8 illustrates a block diagram of the TTE transmitter and one of a plurality of Remote Control Units (RCU) of the preferred embodiment of the apparatus. As discussed above with reference to FIG. 6, each transmit antenna 31 of FIG. 8 is driven by a transmitter 32 located on the surface. The transmitter 32 may be housed in a waterproof housing (not shown) allowing it to be used outside and includes a battery 33 and power supply 34 used to provide the different voltages needed for the internal circuits. Provision may be included for charging the transmitter battery 33 from an external power supply 35. The transmit signal is generated by a digital signal processor (DSP) or dedicated hardware device 36 that outputs a pulse-width modulation (PWM) control signal to the transmit amplifier 37. The use of a PWM amplifier to drive the antenna 31 is preferred due to its high efficiency, ease of control and small size and weight. The DSP circuit 36 receives a timing signal input 38 which provides the frame and timeslot timing. The DSP 36 also provides a timing output 39 for the next transmitter in the system. Data that is sent from the controller (reference 15 of FIG. 6) for transmission to the buried devices is input 40 to the DSP 36 where it is stored in a memory 41 until the next available timeslot. The memory 41 is also used to store the DSP operating system and the program code for the transmitter 32.

The RCU 42, is located below ground and houses the TTE receiver (not shown), control interface 49 and power supply. The TTE receiver uses three antennas 43a, 43b, 43c oriented on orthogonal axes which receive the modulated magnetic field 44 created by the transmit antenna 31. The antenna outputs are amplified and filtered by three separate analog receiver circuits 45a, 45b, and 45c and then sampled by a three channel Analog to Digital Converters (ADC), illustrated as a single ADC 46, which may have 16 bit resolution in order to provide the receiver with a wide dynamic range. The ADC sampling rate may be 96 kHz. The output from the ADC 46 comprises a digital representation of the signal from each antenna 43a, 43b, 43c. These digital signals are processed by a DSP 47, which performs a number of receiver functions, including synchronization of local clocks and frame timing to the transmit signal and the demodulation and error correction or detection of the data sent over the communications link from the transmitter.

The received data may be stored in a memory 48 until the end of the frame before being output in order to synchronize timing between receivers. The data is output via an interface circuit 49 to the sensor or other device 50 co-located with the RCU 42. The RCU 42 is powered from a battery 51, which is connected to a power control circuit 52. This circuit 52 is used to provide the internal supplies for the receiver and optionally for the external device 50 as well. It may also be used to turn off the receiver and device 50 during sleep mode in order to extend the life of the battery 51. The RCU 52 is housed in a rugged, waterproof housing (not shown) suitable for use below ground. The device 50 to be controlled may be integrated into the same housing or may be in a separate enclosure, connected via a cable or connector to the receiver.

Figure 9:
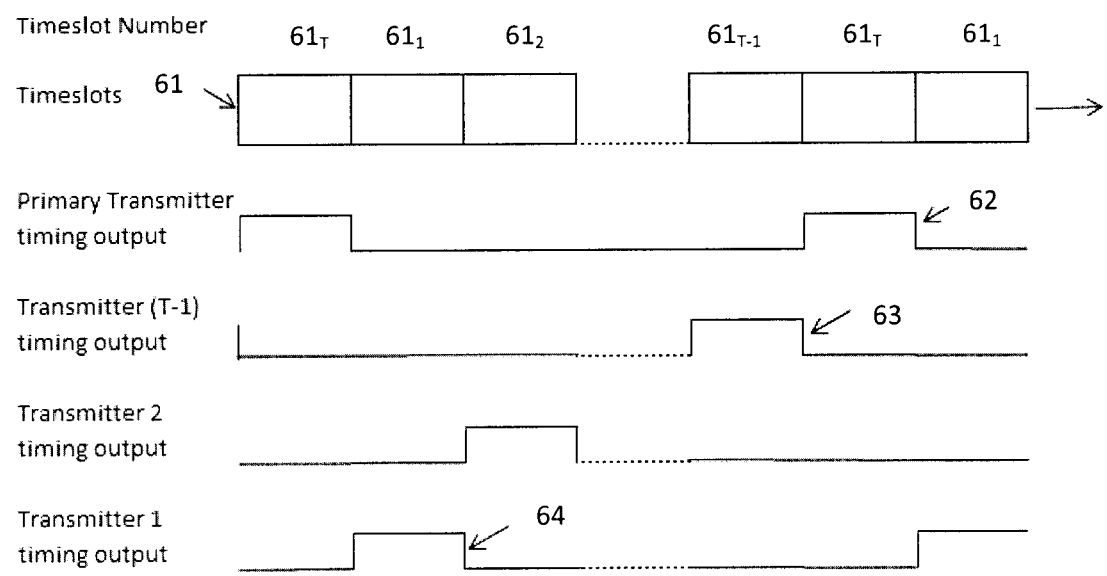
FIG. 9 illustrates the master frame structure of the transmitted signal in accordance with an embodiment.

By way of illustration, a master frame signal is shown in FIG. 9 and contains a number (T) of sequential timeslots as in 61 of equal length. Each transmitter (as in 32 in FIG. 8) is programmed with the number T of timeslots 61 in use so that it can establish the frame timing, and may only output a transmit signal in one timeslot. In all other timeslots, the transmitter 32 is turned off so as not to generate interference for the receivers under adjacent antenna loops (as in 31 in FIG. 8). This arrangement prevents currents flowing in any adjacent loops 31 at the same time, as this would disturb the field in the region under the wires. By only transmitting in one loop 31 at a time, the flux density in the volume of the earth below each loop 31 will be the same as illustrated in FIG. 7b.

In an embodiment, the master frame timing is generated by a primary transmitter which is assigned to timeslot $61_T$. All other transmitters in the system are secondary transmitters and derive their timing from the primary transmitter. The primary transmitter provides an output signal 62 indicating the start and end of timeslot $61_T$. This signal is sent to the next transmitter (e.g. transmitter T−1) in the chain which synchronizes its internal frame timing to it. This transmitter then transmits in timeslot $64_{T-1}$ and generates a timing signal 63 that indicates the beginning and end of timeslot $61_{T-1}$. The timing is thus passed along the chain to the last transmitter (e.g. transmitter 1) which transmits in timeslot $61_1$. This transmitter also outputs a timing signal 64 which allows timeslot $61_T$ to be re-used as may be the case in large coverage areas. The system timing is therefore independent of the controller (reference 15 of FIG. 6) and may be extended to a large number of transmitters.

Figure 10:
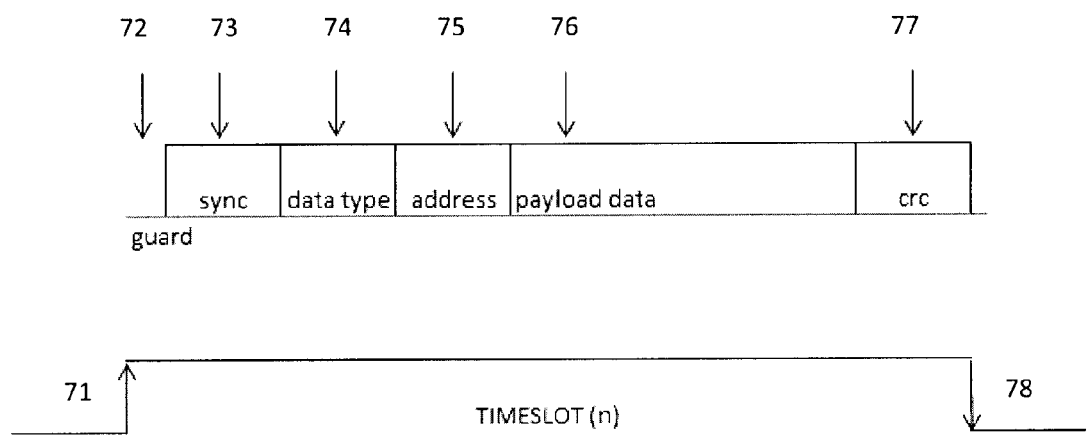
FIG. 10 illustrates the timeslot structure of the transmitted signal in accordance with an embodiment.

Data is forwarded from the controller 15 to each transmitter where it is buffered and output in the timeslot allocated to the transmitter. The data structure for a timeslot is shown in FIG. 10. The timeslot starts 71 with a short guard-space 72, followed by a unique short synchronization code word 73 that is used by the TTE receiver to identify each timeslot and allow the receiver to synchronize its local clock to the frame. The receivers do not need to be associated with a particular transmitter before being buried and may use the period between successive identical sync words to establish the frame length. If a receiver is able to detect transmissions and reliably decode the sync word in more than one timeslot, it may select the timeslot received first to establish frame synchronization. Once sufficient frames have been transmitted to ensure all receivers have had sufficient time to synchronize, data received from the controller 15 may be sent over the wireless interface to the receivers. The data may include fields for the data type 74 or particular receiver addresses 75 as well as the data to be sent to the sensor or other device 76 and an error detecting code such as a cyclic redundancy check (CRC) 77 with which the timeslot ends 78. Data, in the form of a command or meta-command, may then be output from the receiver and sent to the sensor or buried device to initiate a change in state or similar function.

Figure 11:
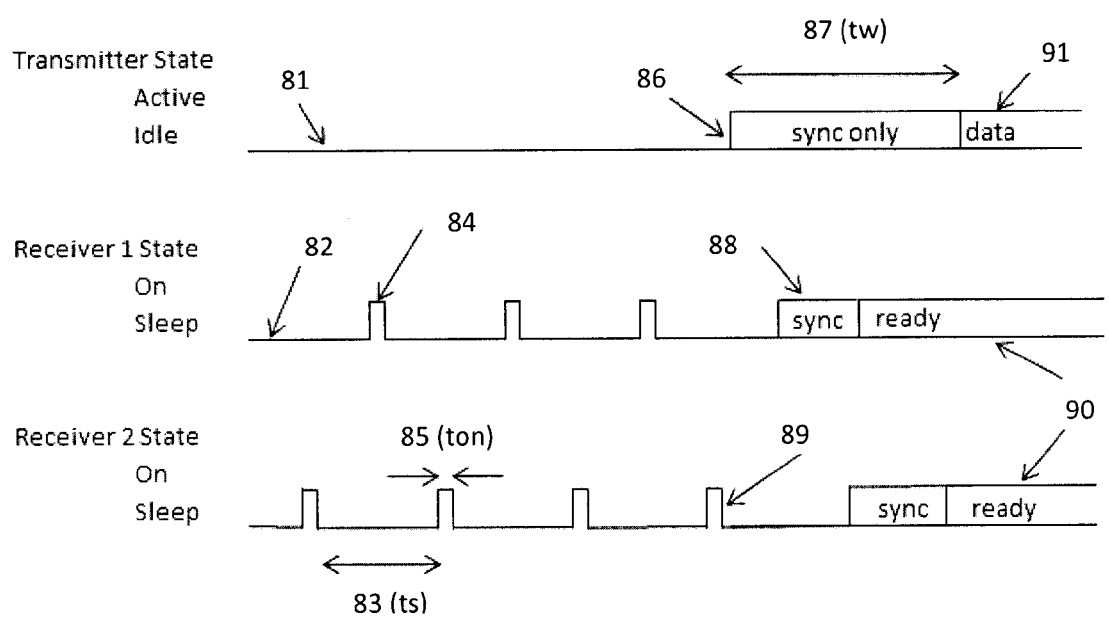
FIG. 11 illustrates the sleep mode of operation in accordance with an embodiment.

To provide a fast response time and maintain accurate synchronization, it is desirable to have a short frame length in the TTE wireless link. However, this limits the amount of data that can be transmitted in a data packet in a given timeslot. For time sensitive commands, a meta-command may be used. The meta-command is illustratively short enough to be transmitted in a single packet, even with coding, and, when received by the RCU (reference 42 in FIG. 8), triggers the RCU 42 to download from the memory (reference 48 in FIG. 8) and send previously stored data or longer commands to the buried device (reference 50 in FIG. 8), using the frame timing to provide synchronous timing as above. In another embodiment, it is possible to extend the battery life of the buried devices by using a sleep mode in the receiver. The operation of sleep mode is illustrated in FIG. 11. In sleep mode, the transmitter(s) are idle 81 and the receiver electronics are turned off 82 with the exception of a low current timer circuit. The timer circuit turns off the receiver electronics for a fixed sleep time, $t_s$, 83, after which the receiver is turned on 84 and starts to search for sync words and to establish the frame timing. If no transmit signal is found after the fixed search period, $t_{on}$ 85, the receiver returns to the sleep mode of operation.

In a preferred embodiment, the receivers are brought out of sleep mode by turning on the transmitter 86 after which it transmits only sync words for a fixed period of time $t_w$ 87, where $t_w > t_s + t_{on}$. This ensures that all receivers have time to turn on and synchronize to the transmitter 88 before any data is output, including a receiver that returned to sleep mode just before the transmitter was activated 89. The time required for the receiver to acquire synchronization may be reduced by using the entire timeslot to transmit a longer synchronization word during $t_w$ 87. Once a receiver turns on and detects the transmitter, it remains on 90 until the transmitter is turned off and sync is lost. During this time the transmitter can send data to the receiver 91.

The battery life of the receiver can be extended greatly using this method, allowing the receivers and associated devices to be buried some time before use. For example, if the receiver current is 300 mA and the battery capacity is 2500 mA-hr, the receiver will only operate continuously for just over eight hours after being activated and buried in the coverage area. If a sleep mode is used with ten minute duration during which the current draw is 50 µA, and the on time is six seconds, the receiver will be capable of synchronizing and receiving data after an idle period of one hundred days.

A buried device may conveniently be controlled by means of one or more short commands transmitted from the above ground controller to the device via the TTE transmitter and receiver. The data may include a header to identify different types of messages and may be further protected from errors by either error correction or error detection. Messages may also be repeated in different frames to provide immunity against longer noise bursts. The payload that follows may be broadcast to all devices in the coverage volume, or may be sent to individual devices or groups of devices based on an ID field included in the payload. If sleep mode is used, the transmitter must remain on for a period exceeding the receiver sleep time before any data is sent, to ensure that all receivers in the coverage area have left sleep mode.

In another embodiment, the present system, method and apparatus may be used to send a command to multiple buried devices simultaneously. The TTE receiver determines which timeslot is being used by a transmitter from the sync word and can then also establish the beginning and end of each frame. To provide a simultaneous output, each receiver stores the message until the end of the frame. At the end of the frame, all the receivers will have received the message and it is output to the buried devices at the same time. The timing error is a function of how much error there is in the frame timing at each receiver. For system operating with a high signal to noise, the error should be small and primarily determined by the delay through the analog receive filters. Prototype systems have achieved a timing accuracy of less than +/−0.5 msec, for example.

Figure 12:
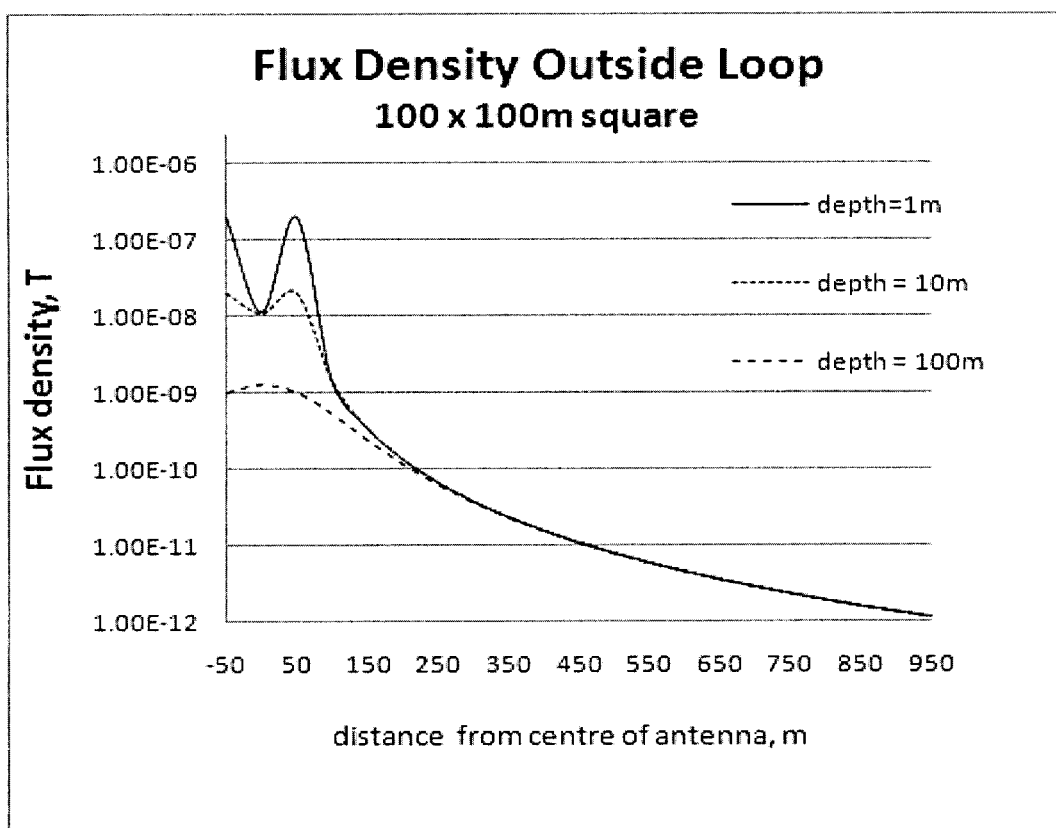
FIG. 12 illustrates the magnetic field in the region outside a square loop antenna in accordance with an embodiment.

In general, it is desirable to minimize the number of timeslots in the frame, in order to maximize the data throughput, as this is shared between timeslots. For very large coverage areas, it is possible to re-use timeslots. This is possible because outside the 100 m$^3$ coverage volume, the magnetic field created by the loop decays quite rapidly. FIG. 12 illustrates the magnetic field along the axis a-a of FIG. 7a, extended outside the transmit loop. Outside the volume below the transmitter loop, the signal represents a source of interference to other transmitters operating in the same timeslot. In this region, the field falls fairly rapidly to the same level regardless of the depth at a distance of about 200 m from the centre of the antenna. The minimum re-use distance is determined by the interference level (I) at the receiver and the lowest level of desired signal (S). For example, for M=4 phase shift keying (PSK) modulation, the signal to interference level (S/I) should be greater than 12 dB for an error rate of less than 1E-6. The potential for interference is highest at the 100 m depth, where the slope of the field strength curve is the lowest. At this depth, providing a separation distance of two loops (300 m from centre to centre) provides an S/I ratio of 24.2 dB at the edge of each loop.

Figures 13A, 13B, 13C:
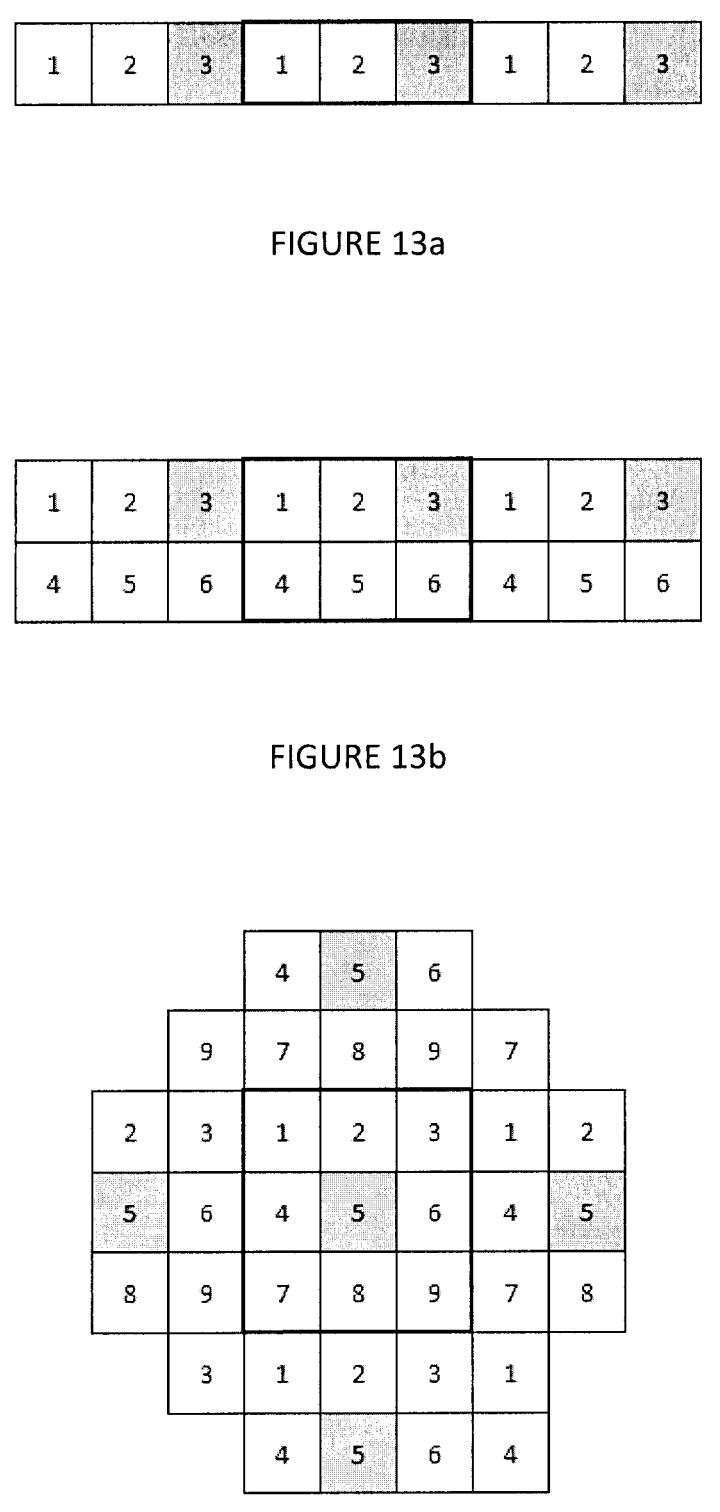

In a large array where timeslots are re-used, the interference will generally be from more than one other loop and act like additive noise. However, because the signal fades rapidly outside the loop, only the nearest sources need to be considered, and a simple re-use pattern may be used. FIG. 13a illustrates a re-use pattern for an area that may be covered with a linear arrangement of square transmit loops. In this case a separation distance of two loops can be provided by using only three timeslots. Additive interference may be received from two adjacent loops so the resulting S/I is 6 dB higher than for a single loop at 18.2 dB. This 1×N coverage pattern may be extended indefinitely without adding significantly to the interference levels. FIG. 13b shows a similar re-use pattern for an area covered by 2×N pattern of antenna loops, which uses 6 timeslots.

FIG. 13c illustrates a re-use pattern that may be extended to cover an arbitrarily large area. This requires nine timeslots, to provide a re-use distance of two loops from the edge of one loop to the edge of the nearest loops using the same timeslot. In this case, the additive interference may be from up to four nearest loops using the same timeslot, and will thus be 12 dB higher than for a single loop. The S/I at a receiver at 100 m depth will therefore be 24.2−12.0=12.2 dB, which is still adequate to ensure reliable synchronization and to transmit data with an error rate lower than 1E-6. This reuse pattern can thus be used to provide communications to buried devices over an arbitrarily large area.

In an illustrative method in accordance with an embodiment, each buried device (reference 50 in FIG. 8) is connected to and co-located with a Remote Control Unit (RCU) (reference 42 in FIG. 8) that can receive VLF signals from the surface and send control messages to the buried device 50. The RCU 42 and buried devices 50 may be battery powered. In this case the apparatus is turned on before being buried.

The area over which the devices 50 and RCU 42 are buried is first divided into squares or rectangles of equal size. The circumference of the square or rectangle being approximately equal to four times the maximum depth of the buried devices 50. A wire loop (reference 31 in FIG. 8) is then placed around the perimeter of each square or loop and connected to a separate VLF transmitter (reference 32 in FIG. 8). The transmitters 32 are identical and drive the antenna loop 31 with the same maximum voltage and at the same nominal frequency. The magnetic field created under each wire loop 31 is thus the same, and the receive signal level may be ensured to be within the dynamic range of the RCU receiver. The RCU receivers are equipped with three loop antennas (references 43a, 43b, 43c in FIG. 8) arranged on orthogonal axes, such that the signal may be received without significant loss regardless of the orientation of the magnetic field to the RCU 42.

One transmitter 32 is assigned to provide the timing reference for the system and generates signal containing frame and timeslot timing. This is conveyed to the other transmitters 32 by means of a cable or wireless signal. The same communication means may be used to connect each transmitter 32 to a common control station. Each transmitter 32 is programmed with the number of timeslots in the frame. For an arbitrarily large area covered by square antenna loops as in 31, nine timeslots may be used. Each transmitter 32 is then also programmed to transmit in one of the timeslots using the time-slot re-use plan illustrated in FIG. 13c. If the area is covered by an array of antennas as in 31 one or two loops wide, the re-use plans of FIG. 13a or FIG. 13b may be used with a reduced number of time-slots.

Once each transmitter 32 is programmed with the correct frame and timeslot information, the transmitters 32 may be turned on for a wake-up period which is long enough to ensure that all the buried RCU 42 have time to exit sleep mode and become active. As each RCU 42 becomes active, it acquires synchronization with the signal in one timeslot and is then able to receive data over the TTE link. The RCU 42 may select the timeslot used for synchronization based on the signal magnitude or a measure of the signal quality. The transmitters 32 may not accept data from the controller (reference 15 in FIG. 6) until after the end of the wake-up period. After the wake up period, control data may be sent from the control station to the transmitters 32 where it is modulated onto the VLF signal. The data is then received at each RCU 42 and may be forwarded immediately to the buried device 50. If is desired to send a signal to all buried devices 50 simultaneously, the RCU 42 may be instructed to forward the data at the end of the frame. Data output to different RCUs 42 may be output with known time delays also by using the frame timing as a reference.

Figure 14A:
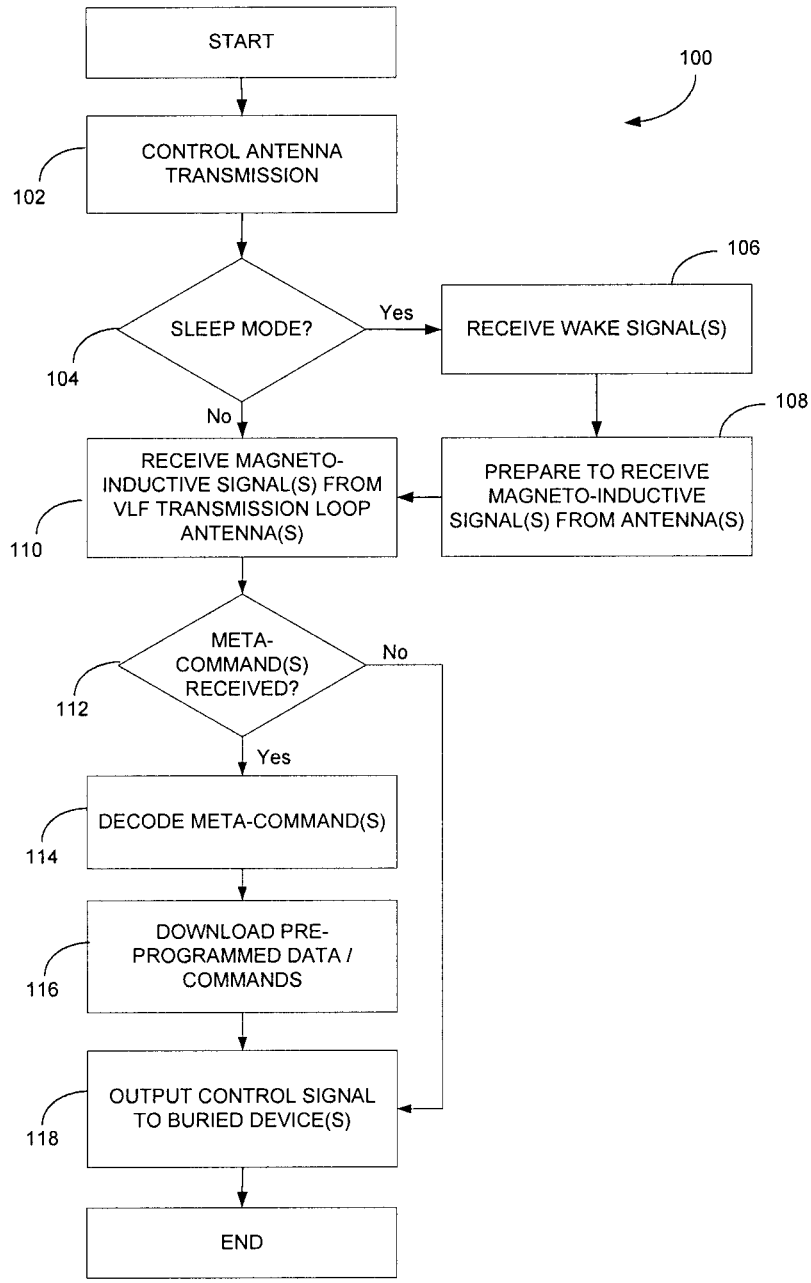
FIGS. 14a, 14b, and 14c illustrate a method of TTE communication for wirelessly controlling one or more buried devices in a desired coverage area in accordance with an embodiment.

In particular, referring to FIG. 14*a*, a method 100 of TTE communication for wirelessly controlling one or more buried devices in a desired coverage area will now be described. The method 100 may comprise the step 102 of controlling antenna transmission, as will be described further with reference to FIG. 14*a*. The method 100 may then flow to the step 104 of assessing whether the receivers are in sleep mode. If this is the case, one or more wake signals may be received at step 106 and the receivers may then prepare at step 108 to receive one or more magneto-inductive signals from one or more VLF transmission loop antennas, as discussed above. The next step 110 may then be to receive the magneto-inductive signals from the antennas. If it is determined at step 104 that the receivers are not in sleep mode, the method 100 may flow directly to the step 110 after step 104. The next step 112 may then be to assess whether one or more meta-commands have been received. If this is the case, the meta-commands may be decoded at step 114 and pre-programmed data or commands may be downloaded to the buried devices at step 116. A control signal comprising the downloaded data or commands may then be output to the buried devices in response to the received magneto-inductive signals at step 118 after which the method 100 may end. If it is determined at step 112 that no meta-commands have been received, the method 100 may flow directly to the step 118 after step 112. In this case, step 118 may comprise outputting to the buried devices a control signal comprising a command forwarded from the controller 15.

Figure 14B:
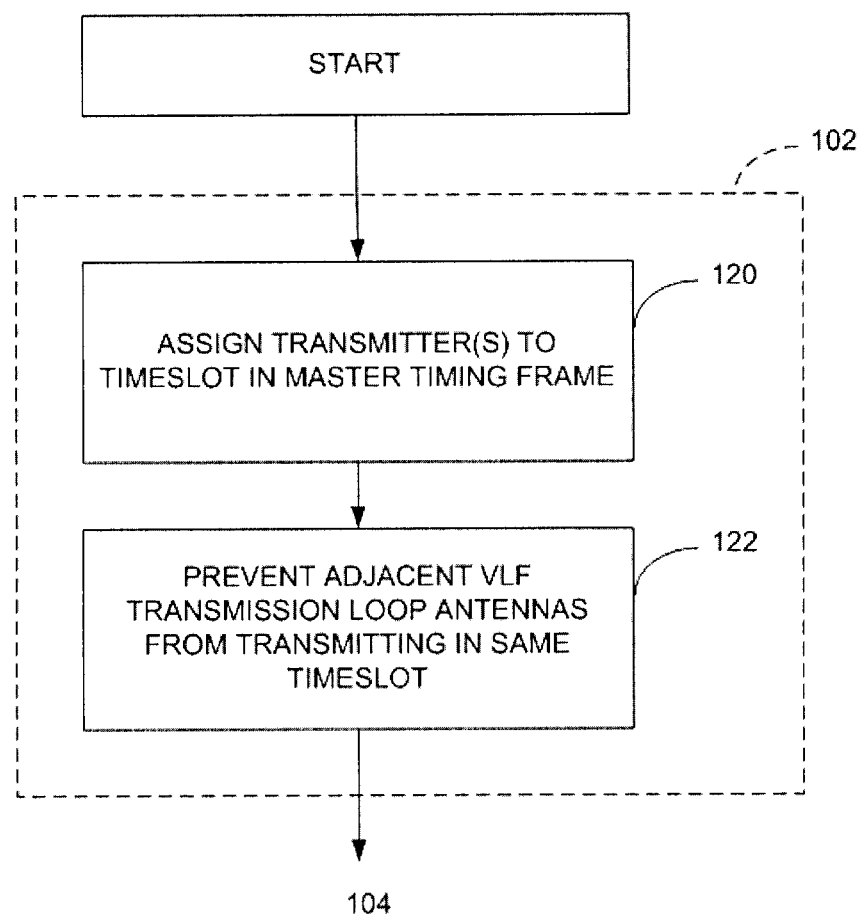

Referring to FIG. 14*b*, the step 102 of controlling antenna transmission illustratively comprises assigning at step 120 one or more transmitters to a timeslot in a master timing frame and preventing adjacent antennas from transmitting in a same timeslot, as discussed above.

Figure 14C:
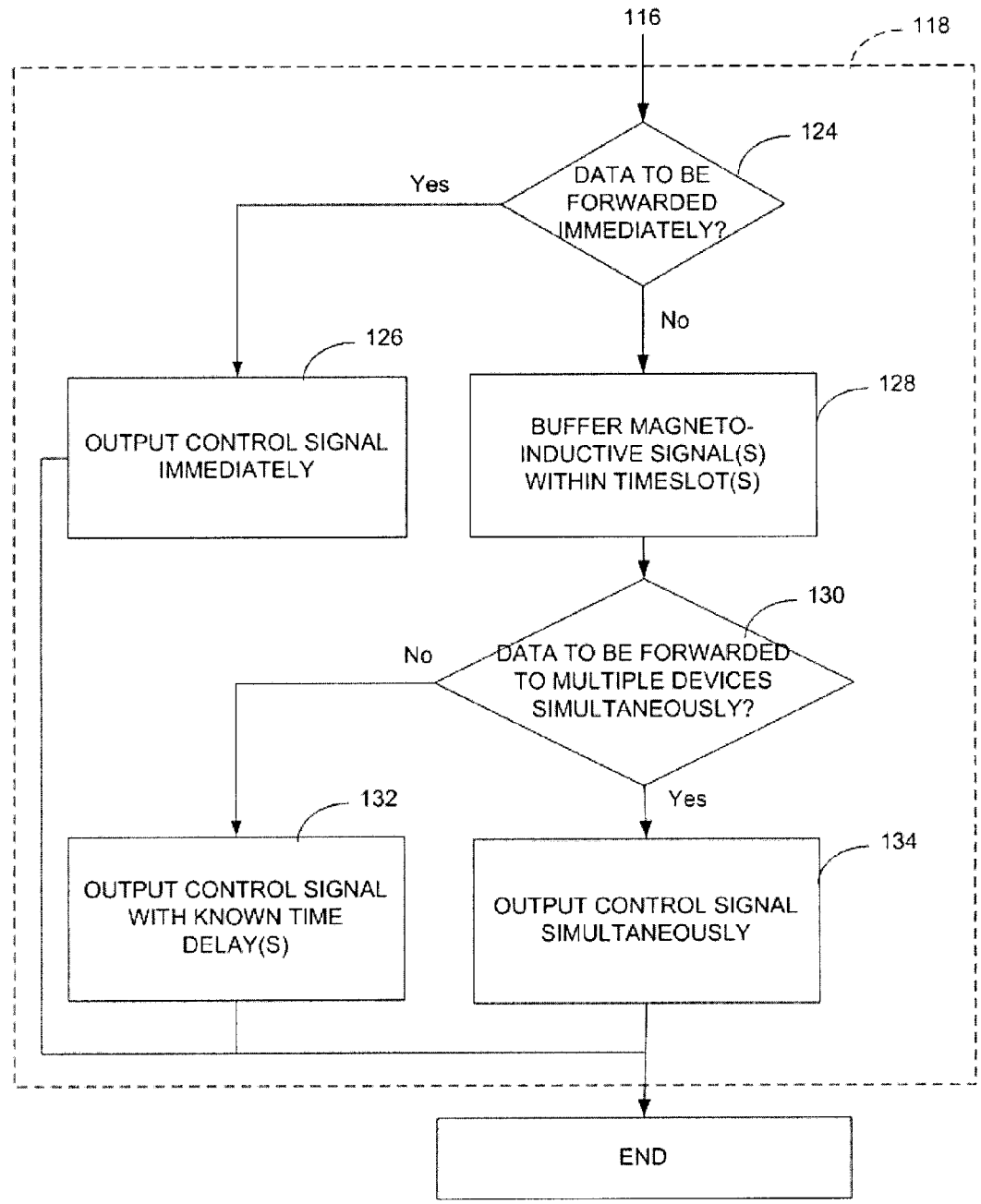

Referring to FIG. 14*c*, the step 118 of outputting a control signal illustratively comprises assessing at step 124 whether data is to be forwarded immediately to the buried device(s) in response to the received magneto-inductive signals. If this is the case, the control signal may be output immediately at step 126. Otherwise, the magneto-inductive signal(s) may be buffered at step 128 within timeslot(s) of the timing frame. The next step 130 may then be to determine whether data from multiple receivers is to be forwarded to multiple buried devices simultaneously. If this is not the case, the control signal may be output with known delays at step 132. Otherwise, the control signal may be output to the multiple devices at step 134 simultaneously at the end of the frame.

The structure illustrated is provided for efficiency of teaching the present embodiment. It should be noted that the present invention can be carried out as a method or can be embodied in an apparatus or a system. The embodiments of the invention described above are intended to be exemplary only. The scope of the invention is therefore intended to be limited solely by the scope of the appended claims.

What is claimed is:

1. A through-the-earth (TTE) communication system for wirelessly controlling one or more buried devices in a desired coverage area, comprising:
   one or more very low frequency (VLF) transmission loop antennas positioned to cover the desired coverage area, the one or more transmission loop antennas each configured to transmit a magneto-inductive signal to a desired operating depth; and
   one or more VLF receivers configured to receive one or more magneto-inductive signals from the one or more VLF transmission antennas, the one or more VLF receivers operatively connected to the one or more buried devices and configured to each output a control signal to a corresponding one of the one or more buried devices in response to the one or more magneto-inductive signals,
   wherein the one or more VLF transmission loop antennas comprise a plurality of square or rectangular antennas positioned in an array to cover the desired coverage area, each of the plurality of VLF transmission loop antennas sized and powered to transmit the magneto-inductive signal to the desired operating depth.

2. The system of claim 1, wherein the one or more VLF transmission loop antennas are configured to provide a maximum flux density at a desired control depth.

3. The system of claim 1, further comprising one or more transmitters operatively connected to the one or more VLF transmission loop antennas, each transmitter configured to control a time at which a corresponding one of the one or more VLF transmission loop antennas transmits the magneto-inductive signal.

4. The system of claim 3, further comprising a transmission controller operatively connected to the one or more transmitters and configured to assign each transmitter to a selected one of a number of different timeslots contained in a master timing frame, whereby only one of any adjacent VLF transmission loop antennas is allowed to transmit the magneto-inductive signal in a given one of the timeslots.

5. The system of claim 4, wherein the transmission controller is time multiplexed and configured to assign more than one transmitter to a selected one of the timeslots for transmission of the magneto-inductive signal in the selected timeslot, provided that the VLF transmission loop antennas connected to the more than one transmitter are not adjacent and each transmits the magneto-inductive signal so as not to interfere with one another.

6. The system of claim 1, wherein the one or more VLF receivers are configured to operate in a sleep mode, and responsive to a wake signal to prepare to receive the one or more magneto-inductive signals from the one or more VLF transmission antennas.

7. The system of claim 6, wherein the one or more VLF receivers are configured to temporarily buffer the one or more received magneto-inductive signals within one or more defined timeslots in a master frame, whereby the one or more VLF receivers can each output the control signal to the corresponding one of the one or more buried devices at a time derived from the master frame.

8. The system of claim 6, wherein the one or more VLF receivers are each configured to receive from the one or more VLF transmission antennas a meta-command, the meta-command occupying a single timeslot in a master frame and instructing the one or more VLF receiver to each download pre-programmed data or commands to the corresponding one of the one or more buried devices.

9. A method of through-the-earth (TTE) communication for wirelessly controlling one or more buried devices in a desired coverage area, comprising:
   receiving one or more magneto-inductive signals from one or more VLF transmission loop antennas, the one or more VLF transmission loop antennas positioned to cover the desired coverage area and each configured to transmit a selected one of the one or more magneto-inductive signals to a desired operating depth;
   outputting a control signal to the one or more buried devices in response to the one or more magneto-inductive signals;
   providing a master timing frame containing a number of different timeslots; and
   assigning each transmitter to a given one of the timeslots for transmission of the one or more magneto-inductive signals;
   whereby only one of any adjacent VLF transmission loop antennas is allowed to transmit the given magneto-inductive signal in the given timeslot.

10. The method of claim 9, further comprising configuring the one or more VLF transmission loop antennas to provide a maximum flux density at a desired control depth.

11. The method of claim 9, further comprising controlling, using one or more transmitters operatively connected to the one or more VLF transmission loop antennas, a time at which each of the one or more VLF transmission loop antennas transmits a given one of the one or more magneto-inductive signals.

12. The method of claim 11, further comprising assigning more than one transmitter to a selected one of the timeslots for transmission of more than one magneto-inductive signals in the selected timeslot, provided that the VLF transmission loop antennas connected to the more than one transmitter are not adjacent and each transmit the given magneto-inductive signal so as not to interfere with one another.

13. The method of claim 11, further comprising:
   receiving meta-commands that occupy a single one of the timeslots,
   decoding the meta-commands, and
   downloading a set of pre-programmed data or commands to the buried devices at a time derived from the master timing frame.

14. The method of claim 9, wherein receiving the one or more magneto-inductive signals comprises receiving the one or more magneto-inductive signals from a plurality of square or rectangular VLF transmission loop antennas positioned in an array to cover the desired coverage area, the plurality of VLF transmission loop antennas each sized and powered to transmit the magneto-inductive signal to the desired operating depth.

15. The method of claim 14, further comprising:
   receiving a wake signal when in a sleep mode; and
   in response to the received wake signal, preparing to receive the one or more magneto-inductive signals from the one or more VLF transmission antennas.

16. The method of claim 9, further comprising:
   temporarily buffering the one or more magneto-inductive signals within one or more defined timeslots; and
   simultaneously outputting the control signal to a plurality of the one or more buried devices.

17. A through-the-earth (TTE) communication apparatus for wirelessly controlling one or more buried devices in a desired coverage area, comprising:
   a VLF receiver operatively connected to the one or more buried devices and configured to receive one or more magneto-inductive signals from one or more VLF transmission antennas; and
   a remote control unit operatively connected to the VLF receiver and the one or more buried devices; the VLF receiver configured to:
      output a control signal to the one or more buried devices in response to the one or more magneto-inductive signals received from one or more VLF transmission loop antennas positioned in an array to cover the desired coverage area;
      provide a master timing frame containing a number of different timeslots; and
      assign each transmitter to a given one of the timeslots for transmission of the one or more magneto-inductive signals;
      whereby only one of any adjacent VLF transmission loop antennas is allowed to transmit the given magneto-inductive signal in the given timeslot.

18. The apparatus of claim 17, wherein the VLF receiver is configured to operate in a sleep mode, and, responsive to receiving a wake signal, to prepare to receive the one or more magneto-inductive signals from the one or more VLF transmission antennas.

19. The apparatus of claim 17, wherein the VLF receiver is configured to temporarily buffer a received one of the one or more magneto-inductive signals, and to output the control signal to a plurality of the one or more buried devices simultaneously.

20. A through-the-earth (TTE) communication apparatus for wirelessly controlling one or more buried devices in a desired coverage area, comprising:
   a transmitter;
   one or more VLF transmission loop antennas operatively connected to the transmitter and positioned in an array to cover the desired coverage area, the one or more VLF transmission loop antennas each configured to transmit a data signal from the transmitter as a magneto-inductive signal to a desired operating depth; and
   one or more VLF receivers configured to receive one or more magneto-inductive signals from the one or more VLF transmission antennas, the one or more VLF receivers operatively connected to the one or more buried devices and each configured to:
      output a control signal to a corresponding one of the one or more buried devices in response to the data signal from the transmitter;
      provide a master timing frame containing a number of different timeslots; and
      assign each transmitter to a given one of the timeslots for transmission of the one or more magneto-inductive signals;
      whereby only one of any adjacent VLF transmission loop antennas is allowed to transmit the given magneto-inductive signal in the given timeslot.

21. The apparatus of claim 20, wherein the data signal from the transmitter is in the form of a meta-command which is decoded by each one of the one or more VLF receivers to output a set of data or commands previously stored in the VLF receiver to the corresponding buried device.

22. A method of through-the-earth (TTE) communication for wirelessly controlling one or more buried devices in a desired coverage area, comprising:
   receiving one or more magneto-inductive signals from one or more VLF transmission loop antennas, the one or more VLF transmission loop antennas positioned to cover the desired coverage area and each configured to transmit a selected one of the one or more magneto-inductive signals to a desired operating depth; and outputting a control signal to the one or more buried devices in response to the one or more magneto-inductive signals, wherein receiving the one or more magneto-inductive signals comprises receiving the one or more magneto-inductive signals from a plurality of square or rectangular VLF transmission loop antennas positioned in an array to cover the desired coverage area, the plurality of VLF transmission loop antennas each sized and powered to transmit the magneto-inductive signal to the desired operating depth.

* * * * *